United States Patent
Hibbard

(10) Patent No.: US 9,638,341 B1
(45) Date of Patent: May 2, 2017

(54) LOOP FLUSHING VALVE

(71) Applicant: Hydro-Gear Limited Partnership, Sullivan, IL (US)

(72) Inventor: John Tyler Hibbard, Indianapolis, IN (US)

(73) Assignee: Hydro-Gear Limited Partnersip, Sullivan, IL (US)

( * ) Notice: Subject to any disclaimer, the term of this patent is extended or adjusted under 35 U.S.C. 154(b) by 139 days.

(21) Appl. No.: 14/713,445

(22) Filed: May 15, 2015

Related U.S. Application Data

(60) Provisional application No. 62/020,741, filed on Jul. 3, 2014, provisional application No. 61/994,667, filed on May 16, 2014.

(51) Int. Cl.
  *G05D 11/00* (2006.01)
  *F16K 17/04* (2006.01)
  *F15B 21/04* (2006.01)
  *F16K 1/32* (2006.01)
  *F16K 31/12* (2006.01)

(52) U.S. Cl.
  CPC .......... *F16K 17/044* (2013.01); *F15B 21/042* (2013.01); *F16K 1/32* (2013.01); *F16K 31/12* (2013.01); *Y10T 137/2567* (2015.04)

(58) Field of Classification Search
  CPC ......... Y10T 137/2521; Y10T 137/2564; Y10T 137/2567
  See application file for complete search history.

(56) References Cited

U.S. PATENT DOCUMENTS

| 2,900,166 | A | | 8/1959 | Boosman |
| 2,961,829 | A | | 10/1959 | Weisenbach |
| 3,550,611 | A | * | 12/1970 | Johannes ............ F15B 13/00 137/111 |
| 3,901,261 | A | * | 8/1975 | Riis ............ F16K 11/205 137/100 |
| 4,128,113 | A | | 12/1978 | Hart |
| 4,324,311 | A | | 4/1982 | Farris |

(Continued)

OTHER PUBLICATIONS

Parker Catalog HY15-35021US, "Shuttle Valves," Obtained from web page <http://www.parker.com/literature/Literature%20Files/IHD/SHsection.pdf> on Nov. 16, 2015 (17 pp.).

(Continued)

*Primary Examiner* — R. K. Arundale
(74) *Attorney, Agent, or Firm* — Neal, Gerber & Eisenberg LLP

(57) ABSTRACT

A loop flushing valve assembly for use in a hydraulic circuit has a pair of valve subassemblies cooperating with a respective valve seat between a port and an outlet passage. Each subassembly has a main port plug and a fluid passage plug with a fluid passage extending therethrough. A valve body is engaged to the fluid passage plug and is axially moveable from a closed position where its seat end is in contact with its respective valve seat to prevent fluid flow from the respective fluid side to the outlet passage to an open position and the valve body is biased to the closed position. A poppet extends out the seat end of the each valve body. When pressure in one fluid side exceeds pressure in the other side, the valve subassembly poppet axially moves towards the other poppet to open the other side.

17 Claims, 7 Drawing Sheets

(56) References Cited

U.S. PATENT DOCUMENTS

| | | | |
|---|---|---|---|
| 4,332,134 | A | 6/1982 | Cochran et al. |
| 4,343,601 | A | 8/1982 | Thorson |
| 4,467,825 | A | 8/1984 | Boyd |
| 4,691,730 | A | 9/1987 | Portolese et al. |
| 4,936,334 | A | 6/1990 | Hendershot |
| 5,038,827 | A | 8/1991 | Heffner et al. |
| 5,190,356 | A | 3/1993 | Knowles |
| 6,068,451 | A | 5/2000 | Uppal |
| 6,263,670 | B1 | 7/2001 | Gluck et al. |
| 6,332,393 | B1 | 12/2001 | Trimble |
| 6,371,149 | B1 | 4/2002 | Gust et al. |
| 6,430,923 | B1 | 8/2002 | Meier |
| 7,430,860 | B2 | 10/2008 | Whitaker et al. |
| 8,132,588 | B1 | 3/2012 | Langenfeld et al. |
| 8,347,620 | B2 | 1/2013 | Yu et al. |
| 8,991,416 | B2 | 3/2015 | Bresnahan |
| 2004/0187491 | A1* | 9/2004 | Whitaker ................ F04B 1/145 60/476 |

OTHER PUBLICATIONS

Eaton Brochure, "1HSH701—Hot Oil Shuttle Valve," Dec. 2009 (2 pp.).

Sauer Danfoss, "Loop Flushing Valve Technical Information," Aug. 2010 (8 pp.).

\* cited by examiner

LOOP FLUSHING VALVE

CROSS REFERENCE

This application claims the benefit of U.S. Provisional Application No. 61/994,667, filed on May 16, 2014, and U.S. Provisional Application No. 62/020,741, filed on Jul. 3, 2014. The contents of these applications are incorporated herein by reference.

BACKGROUND OF THE INVENTION

This invention relates generally to the design of valves and, more particularly, to the design of a loop flushing valve for use in a hydraulic circuit.

SUMMARY OF THE INVENTION

The loop flushing valve disclosed herein has use in many applications and is depicted herein as used in a hydraulic component such as a hydraulic pump or motor or a hydrostatic transmission or transaxle having an integral hydraulic circuit comprising a pump and motor in fluid communication. The valve disclosed herein operates in a manner similar to that of an overlapped spool valve used as a loop flushing valve, but is less complex and easier to assemble. A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
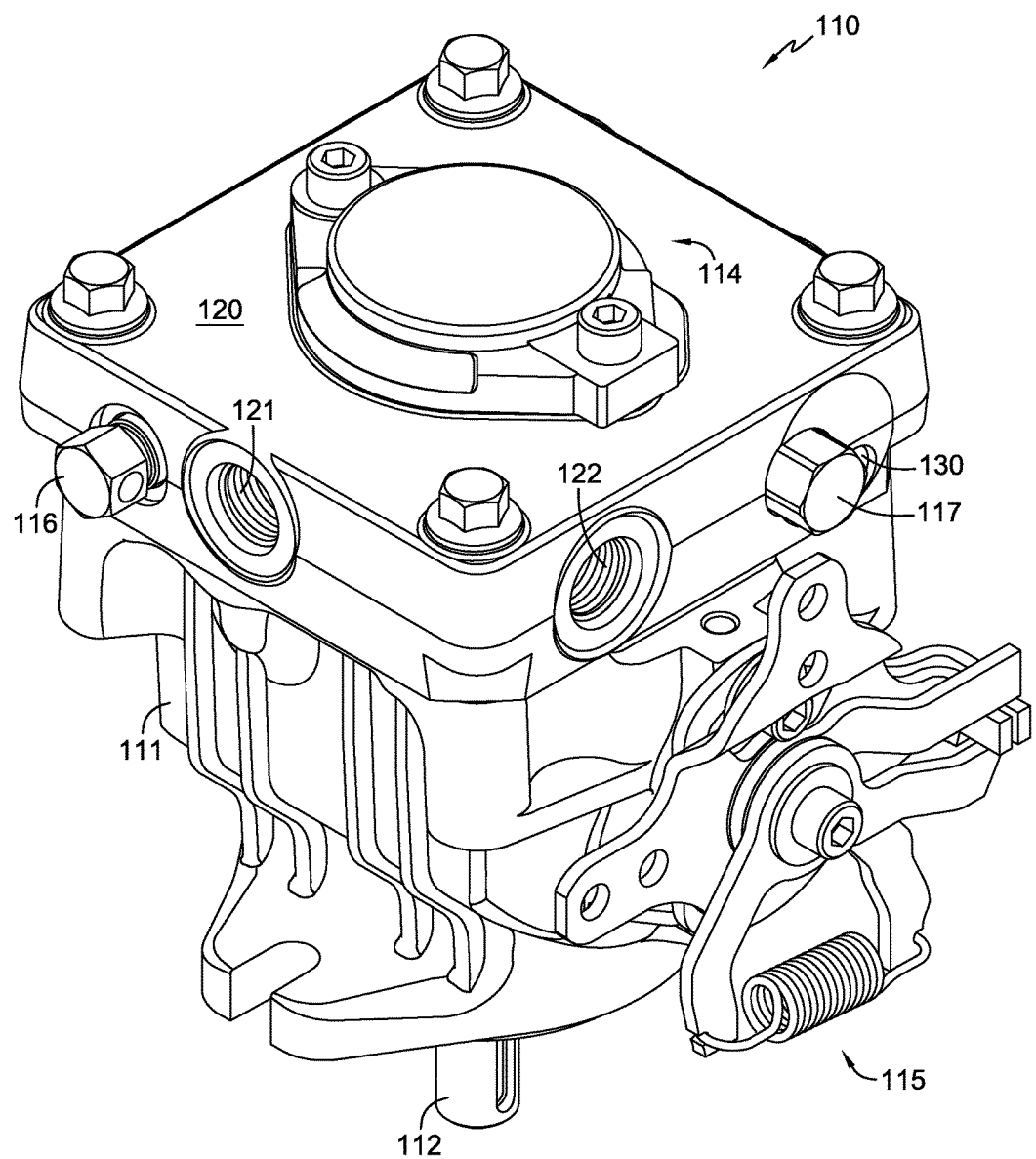
FIG. 1 is a perspective view of an exemplary pump assembly in which a valve in accordance with the teachings herein may be used.
Figure 2:
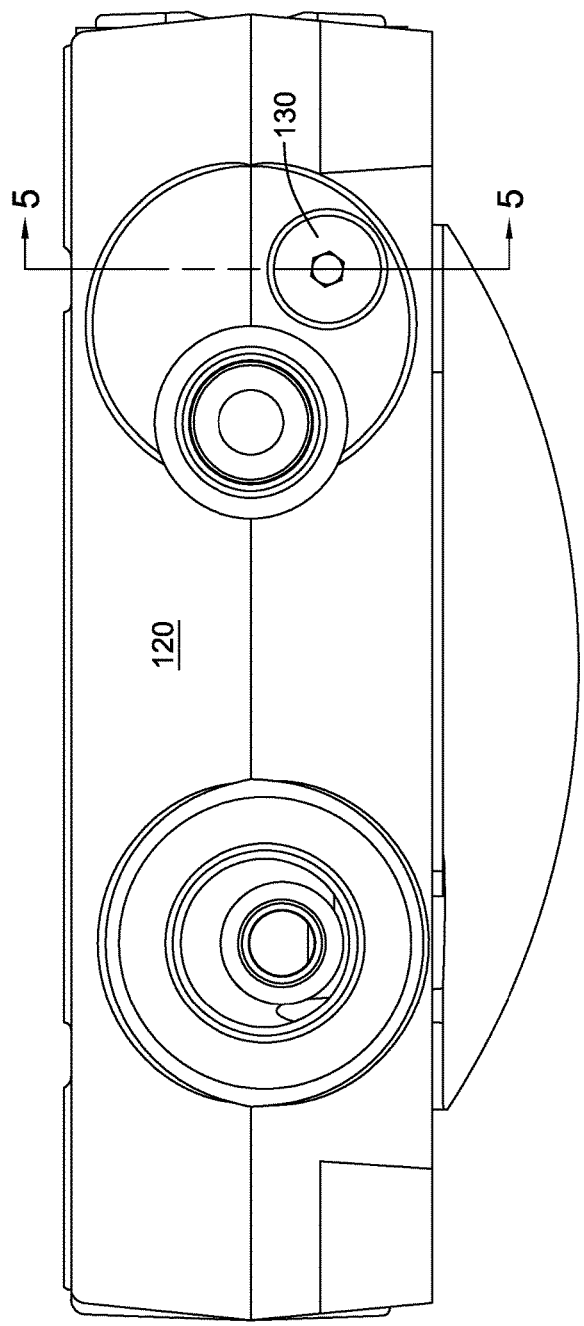
FIG. 2 is a side elevational view of the end cap portion of the pump assembly shown in FIG. 1.
Figure 3:
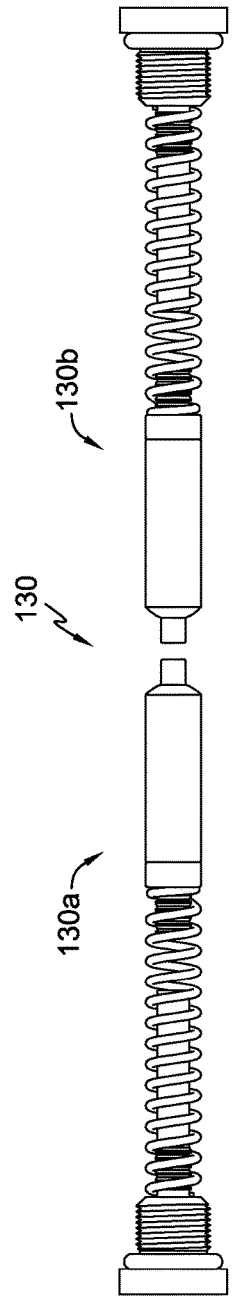
FIG. 3 is a side elevational view of a valve as disclosed herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. This specification is intended to be taken as a whole and interpreted in accordance with the principles of the inventions as taught herein and understood by one of ordinary skill in the art.

Figure 8:
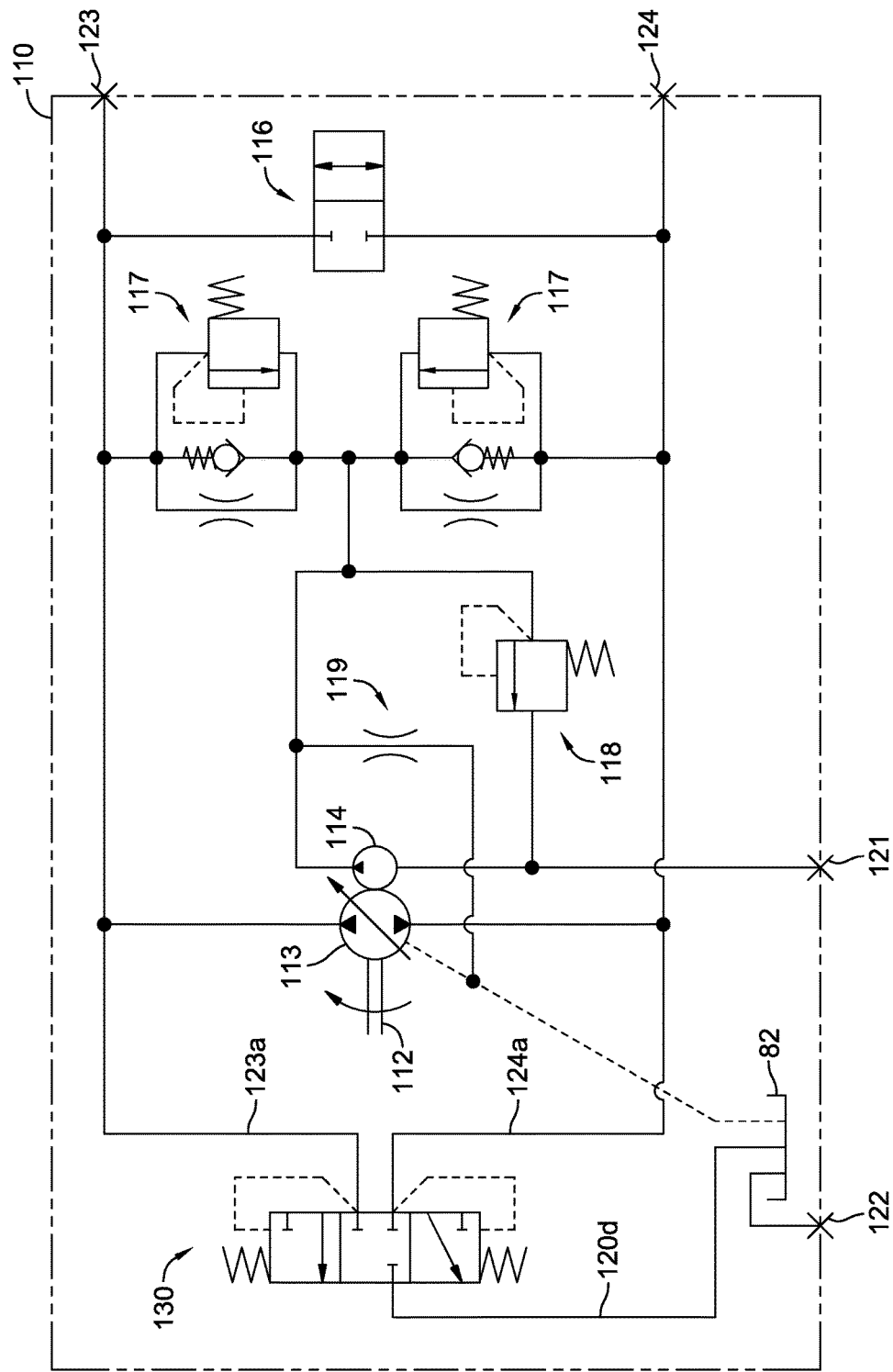
FIG. 8 is a schematic view of the assembly in which the valve disclosed herein is incorporated.

The loop flushing valve disclosed herein may be used in a variety of applications and is depicted herein used in end cap 120 of variable displacement pump assembly 110, as depicted in FIGS. 1 and 8. The basic construction of such a pump assembly is known in the art, and disclosed in commonly owned U.S. Pat. No. 6,332,393, the terms of which are incorporated herein by reference.

Pump assembly 110 includes an axial piston pump 113 driven by input shaft 112 disposed in housing 111 and running on end cap 120. Housing 111 and end cap 120 cooperate to form internal sump 82, shown schematically in FIG. 8. A charge pump 114 and a return to neutral (RTN) assembly 115 are also provided. End cap 120 includes charge inlet port 121 connected to charge pump 114 and case drain port 122 connected to internal sump 82. System ports 123 and 124 are connected to a pair of system passages 123a and 124a formed in end cap 120. As is known, a set of check/relief valves 117 and a bypass valve 116 are used between system fluid passages 123a and 124a. Relief valve 118 is used with charge pump 114 to relieve excess pressure and a bleed passage 119 may be provided to ensure a constant fluid flow to help cool pump 113. Depending upon system requirements, the size of charge pump 114, and the desired opening pressure of flushing valve 130, bleed passage 119 may not be required or may become too small to be practical or useful.

Figure 9:
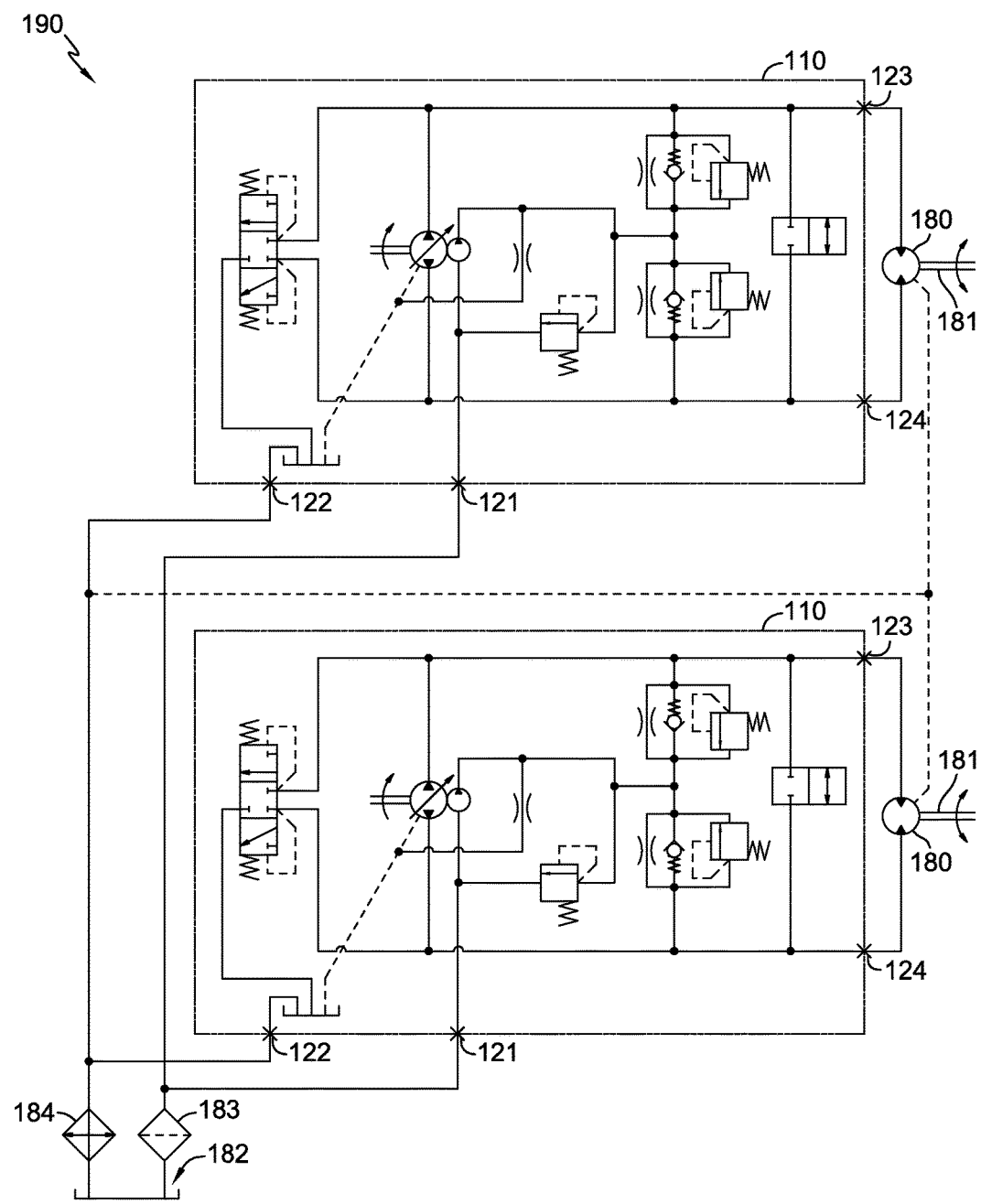
FIG. 9 is a schematic view of a vehicle incorporating two of the assemblies in which the valve disclosed herein is incorporated.

Flushing valve 130 is disposed between system fluid passages 123a and 124a, as shown in FIG. 8, which depicts the hydraulic system schematically, while FIG. 9 schematically shows a zero turn vehicle 190 in which two separate pump assemblies 110 using separate flushing valves 130 may be incorporated. Each pump assembly 110 may be connected to a separate hydraulic motor 180, which drives a separate motor output shaft or axle 181. In the vehicle embodiment of FIG. 9, the connection of both pump assemblies 110 to a common reservoir 182 is depicted, along with a filter 183 connected between common reservoir 182 and the two charge pump inlet ports 121. Heat exchanger 184 is located between the two case drain ports 122 and common reservoir 182.

Figure 4:
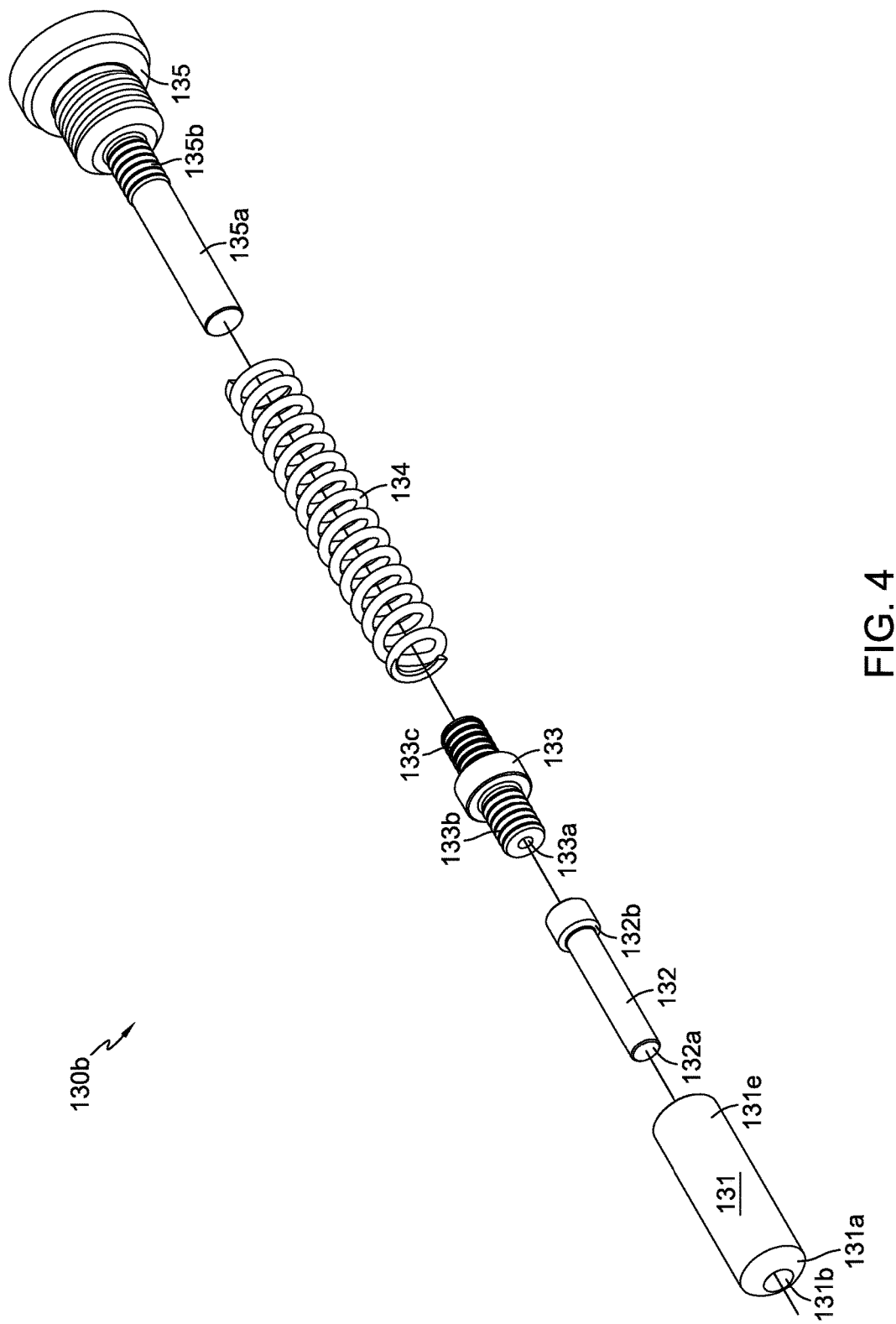
FIG. 4 is an exploded perspective view of one of the valve subassemblies of FIG. 3.
Figure 5:
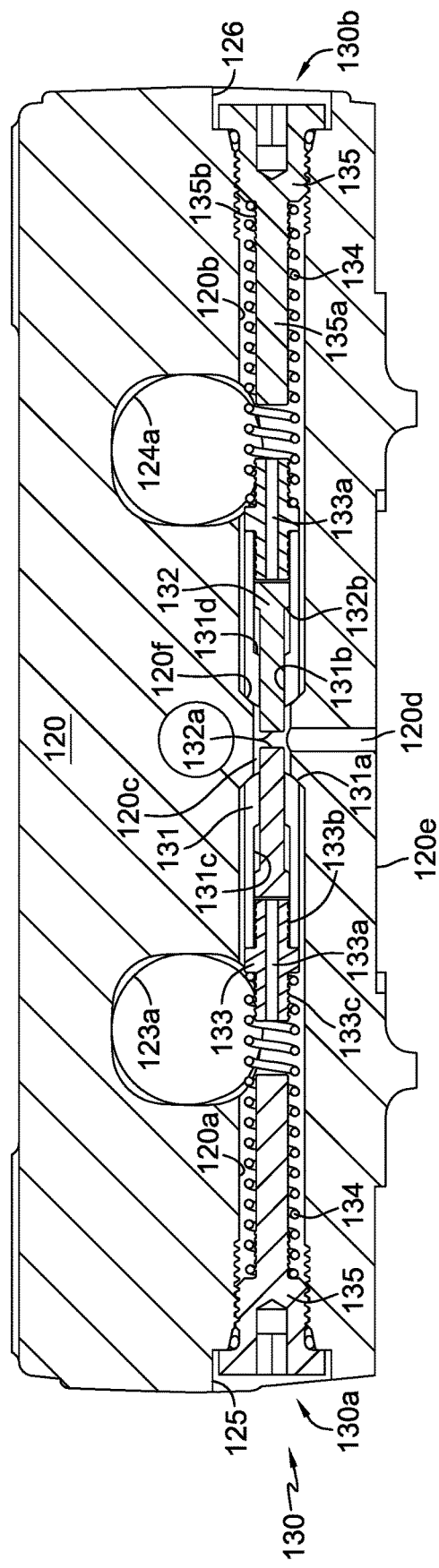
FIG. 5 is a cross-sectional view of the end cap with the valve, along the lines 5-5 of FIG. 2, where both valve subassemblies are in the closed position.

Two valve subassemblies 130a and 130b are depicted in, e.g., FIG. 5, and the construction of each valve subassembly is shown most clearly in the exploded view of subassembly 130b depicted in FIG. 4. It will be understood that the construction of valve subassembly 130a will be substantially identical to the following description of valve subassembly 130b. For purposes of convenience only in connection with the following description, the term "proximal" is used to denote an end closer to port plug 135 and "distal" is used to denote an end located further from port plug 135. In addition, the terms "left" and "right" are used for convenience only with respect to the views such as those of FIGS. 5, 6 and 7.

Valve subassembly 130b includes a main port plug 135, spring 134, fluid passage plug 133, poppet 132 and main valve body 131. Main valve body 131 includes a passage extending therethrough, and specifically a first, smaller diameter bore 131b adjacent its distal end and connected to a second, larger diameter bore 131c adjacent to its proximal end.

Port plug 135 includes an optional stem 135a having optional spring grip serrations 135b formed thereon at the inner portion thereof. Fluid passage plug 133 has a fluid passage 133a extending therethrough, and a set of spring grip serrations 133c, similar to the spring grip serrations 135b, formed on one side thereof to engage one end of spring 134, and a set of crimp serrations 133b formed on the other side thereof to engage the larger diameter bore 131c at the proximal end 131e of main valve body 131, by means of crimping proximal end 131e, such that plug 133 and main valve body 131 move axially together. As shown, serrations 133b and 133c may be the same as one another (mirrored), and the stems of plug 133 on which they are formed may be of the same length, such that fluid passage plug 133 is symmetrical in order to prevent assembly errors. Other means of connecting plug 133 to main valve body 131 could also be used.

Both valve subassemblies are biased to the closed position in this invention. In the embodiment depicted, a spring 134 is disposed between port plug 135 and fluid passage plug 133 to assist in biasing the valve subassembly to the closed position. The two sets of spring grip serrations 135b and 133c act to hold the ends of spring 134 on these respective plugs 133, 135 to aid in assembly and installation, although it will be understood that other means of connection could be used and that connection of spring 134 to plug 135 is optional. The use of a structure such as stem 135a is preferable in that it assists in preventing deflection of spring 134.

A poppet 132 is disposed inside main valve body 131, as shown in FIG. 5, and has a distal end 132a, which can be referred to as a contact end, and a shoulder 132b formed near its proximal end, which is adjacent to and engagable with fluid passage plug 133. The range of motion of poppet 132 within main valve body 131 is limited in one direction by the interaction of shoulder 132b with an internal shoulder, or poppet stop 131d, formed at the interface between first, smaller diameter bore 131b and second, larger diameter bore 131c.

Figure 6:
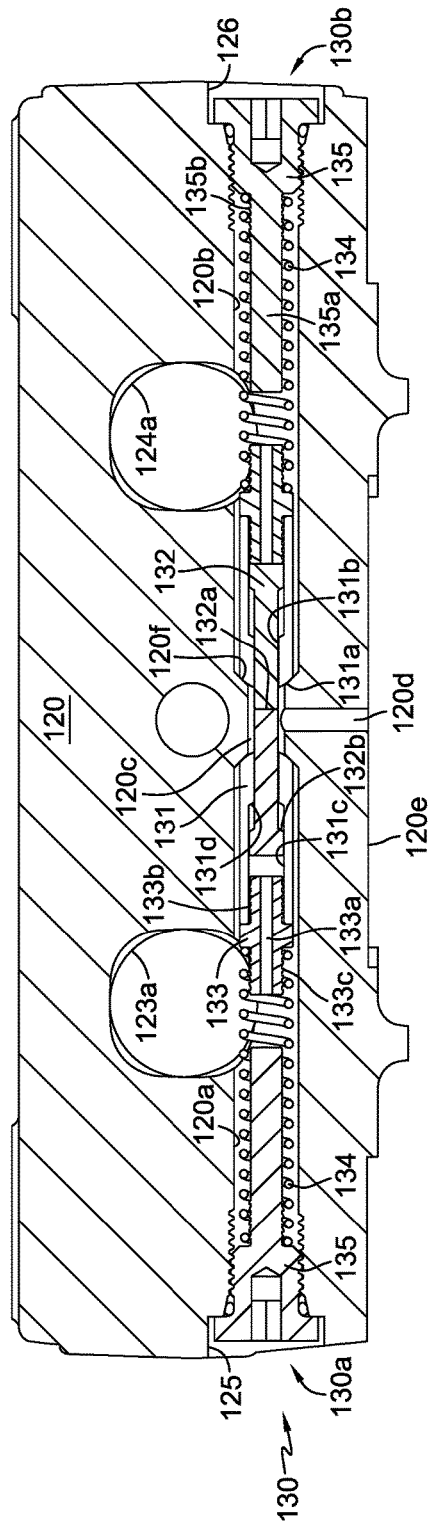
FIG. 6 is a cross-sectional view similar to FIG. 5, with both valve subassemblies in the closed position and the system under pressure.
Figure 7:
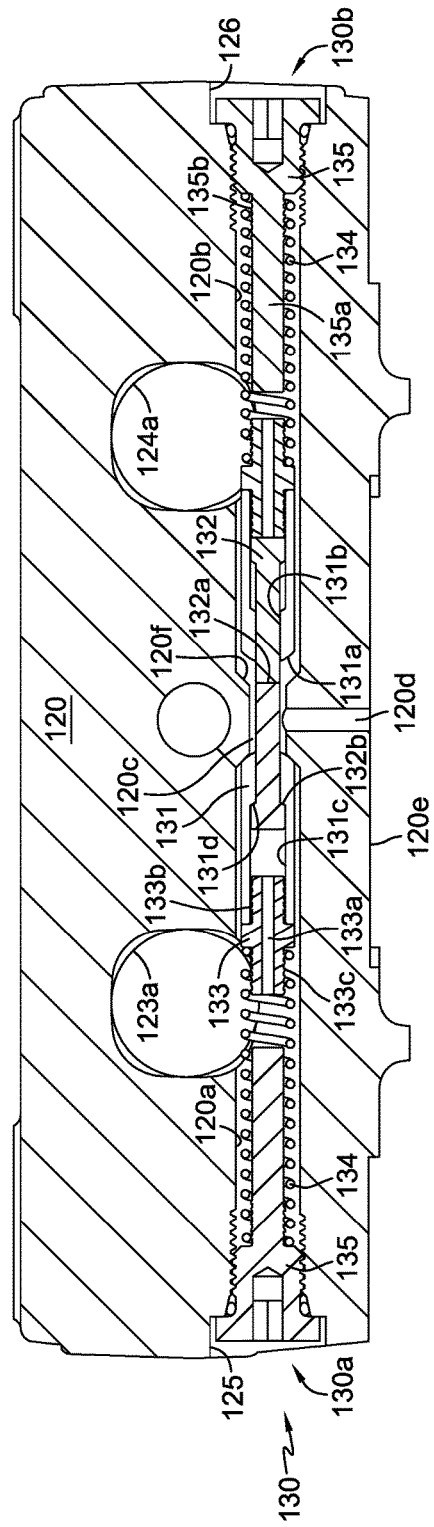
FIG. 7 is a cross-sectional view similar to FIGS. 5 and 6, with one of the valve subassemblies in the open position.

The cross-sectional views of FIGS. 5, 6 and 7 show the two valve subassemblies 130a and 130b inside end cap bores 120a and 120b, respectively, and in fluid communication with system fluid passages 123a and 124a, respectively. First bore 120a and second bore 120b meet in a connecting passage 120c and are connected to outlet passage 120d, which is then indirectly connected to case drain port 122. Both valve subassemblies 130a and 130b are depicted in the closed position in FIG. 5, in that main valve body 131 is pressed against valve seat 120f on each, thereby preventing fluid flow from either system fluid passage 123a, 124a to outlet passage 120d. In FIG. 5, the distal ends 132a of the two poppets are depicted as not being in contact with one another for clarity of disclosure, but it will be understood that once the system is assembled and any pressure is applied to the system passages 123a and 124a, the distal ends 132a of the two poppets 132 will be in contact with one another, such as is shown in FIG. 6. It will also be understood that when the valve subassemblies are in the "closed" position, there is no material fluid flow from the respective fluid side 123a or 124a to the outlet passage 120d, although there may still be de minimus leakage around the various components.

In FIG. 6, the system passage 123a is under higher pressure than the system passage 124a. This could be a minor pressure differential, such as when the system is in neutral or near neutral. At this depicted position, right side poppet 132 has contacted right side plug 133, but has not yet applied sufficient force to right side plug 133 against the bias of spring 134 to open the right side of the valve; i.e., right side main valve body 131 is not yet unseated from its valve seat 120f. As the pressure in system passage 123a increases, high pressure fluid passes through fluid passage 133a and moves poppet 132 on the left side valve subassembly 130a towards the right. Eventually the left side poppet 132 will push the right side poppet 132 sufficiently such that the right side valve subassembly 130b is opened, as is shown in FIG. 7. Specifically, plug 133, which is crimped to the proximal end 131e of main valve body 131, is moved to the right a sufficient distance to pull the valve seat end 131a off right valve seat 120f. This places right system fluid passage 124a in fluid communication with outlet passage 120d and then to case drain port 122.

As shown, the two springs 134 bias both valve subassemblies 130a and 130b to the closed position when the hydraulic system is at or near the neutral position, where there may be a relatively small pressure differential between the pressure sides. This design improves efficiency over shuttle valve designs which may permit fluid flow between the two system sides; such cross-flow decreases performance of the system and in a hydraulically driven vehicle can significantly impair vehicle ride quality. The use of springs 134 permits a broader range of pressures where both valves remain closed. Furthermore, keeping both valves closed at or near neutral improves the warm-up characteristics of the system since there is no oil lost to sump during the startup process. Other prior art hot oil shuttle designs which operate in a manner similar to that described herein are significantly more complex and expensive to manufacture and assemble. In certain applications, one could eliminate springs 134 and simply rely on the opposing pressure in both system fluid passages 123a and 124a to keep both valves in the closed position at neutral.

The smaller size of poppets 132 compared to the size of valve seat ends 131a maintains the valve bodies 131 in the closed position until a sufficient pressure differential between first fluid side 123a and second fluid side 124a is generated. When the first fluid side 123a is at higher pressure, and the pressure differential between it and the second fluid side 124a reaches a first set amount, first poppet 132 will cause second valve body 131 to move to its open position. Similarly, when the second fluid side 124a is at higher pressure, and the pressure differential between it and the first fluid side 123a reaches a second set amount, second poppet 132 will cause first valve body 131 to move to its open position. The first set amount is preferably equal to the second set amount.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A loop flushing valve assembly for use in connection with a hydraulic circuit having a first port in communication with a first fluid side, a second port in communication with a second fluid side, and an outlet passage connected to the first port, the second port and a sump, the loop flushing valve assembly comprising:

a first valve seat disposed between the first port and the outlet passage, and a second valve seat disposed between the second port and the outlet passage;

a first valve subassembly disposed in the first port and a second valve subassembly disposed in the second port, wherein the first valve subassembly and the second valve subassembly each comprise:

a main port plug;

a fluid passage plug having a first end and a second end, and a fluid passage extending through the fluid passage plug from the first end to the second end;

a spring providing a spring force and engaged to the fluid passage plug;

a valve body having a proximal end engaged to the second end of the fluid passage plug and a distal seat end, and a bore extending through the valve body, wherein the valve body is axially moveable from a closed position where the distal seat end is in contact with its respective valve seat to prevent fluid flow from the respective fluid side to the outlet passage, to an open position where the distal seat end is not in contact with its respective valve seat, and the valve body is biased to the closed position by the spring; and a poppet partially disposed in the bore of the valve body, the poppet having a first contact end extending out through the distal seat end of the valve body, a second end, and a shoulder formed adjacent to the second end;

wherein, when the pressure in the first fluid side exceeds the pressure in the second fluid side, the first valve subassembly poppet will axially move towards the second valve subassembly poppet, and when a pressure differential between the first fluid side and the second fluid side is sufficient to overcome the spring force of the second valve subassembly spring, the first valve subassembly poppet will cause the second valve subassembly valve body to move to its open position; and wherein, when the pressure in the second fluid side exceeds the pressure in the first fluid side, the second valve subassembly poppet will axially move towards the first valve subassembly poppet, and when the pressure differential between the second fluid side and the first fluid side is sufficient to overcome the spring force of the first valve subassembly spring, the second valve subassembly poppet will cause the first valve subassembly valve body to move to its open position.

2. The loop flushing valve assembly of claim 1, wherein for both the first valve subassembly and the second valve subassembly, the bore of the valve body comprises:

a first portion adjacent the proximal end and having a first diameter;

a second portion adjacent the distal seat end and having a second diameter that is less than the first diameter; and an internal shoulder between the first portion and the second portion, wherein the internal shoulder engages the shoulder of the poppet to limit axial motion of the poppet.

3. The loop flushing valve assembly of claim 1, wherein for both the first valve subassembly and the second valve subassembly, the proximal end of the valve body is crimped to the second end of the fluid passage plug.

4. The loop flushing valve assembly of claim 1, wherein the respective springs of the first valve subassembly and the second valve subassembly are disposed between and engaged to their respective main port plug and fluid passage plug.

5. The loop flushing valve assembly of claim 4, wherein for both the first valve subassembly and the second valve subassembly, each fluid passage plug comprises a first stem having spring grip serrations formed thereon, and a distal end of the spring is engaged to the first stem and secured by the spring grip serrations.

6. The loop flushing valve assembly of claim 5, wherein for both the first valve subassembly and the second valve subassembly, each fluid passage plug further comprises a second stem having crimp serrations formed thereon, and the proximal end of the valve body is crimped to the second stem by the crimp serrations.

7. The loop flushing valve assembly of claim 6, wherein the first stem and the second stem are the same length, and the spring grip serrations are identical to the crimp serrations.

8. A loop flushing valve assembly for use in connection with a hydraulic circuit having a first port in communication with a first fluid side, a second port in communication with a second fluid side, and an outlet passage connected to the first port, the second port and a sump, the loop flushing valve assembly comprising:

a first valve seat disposed between the first port and the outlet passage, and a second valve seat disposed between the second port and the outlet passage;

a first valve subassembly disposed in the first port and a second valve subassembly disposed in the second port, wherein the first valve subassembly and the second valve subassembly each comprise:

a main port plug;

a fluid passage plug having a first end and a second end, and a fluid passage extending through the fluid passage plug from the first end to the second end;

a valve body having a proximal end engaged to the second end of the fluid passage plug and a distal seat end, and a bore extending through the valve body, wherein the valve body is axially moveable from a closed position where the distal seat end is in contact with its respective valve seat to prevent fluid flow from the respective fluid side to the outlet passage, to an open position where the distal seat end is not in contact with its respective valve seat, and the valve body is biased to the closed position; and a poppet partially disposed in the bore of the valve body, the poppet having a first contact end extending out through the distal seat end of the valve body, a second end, and a shoulder formed adjacent to the second end;

wherein, when the pressure in the first fluid side exceeds the pressure in the second fluid side by a first set amount, the first valve subassembly poppet will cause the second valve subassembly valve body to move to its open position; and wherein, when the pressure in the second fluid side exceeds the pressure in the first fluid side by a second set amount, the second valve subassembly poppet will cause the first valve subassembly valve body to move to its open position.

9. The loop flushing valve assembly of claim 8, wherein for both the first valve subassembly and the second valve subassembly, the bore of the valve body comprises:
 a first portion adjacent the proximal end having a first diameter;
 a second portion adjacent the distal seat end having a second diameter, wherein the second diameter is less than the first diameter; and
 an internal shoulder between the first portion and the second portion, wherein the internal shoulder engages the shoulder of the poppet to limit axial motion of the poppet.

10. The loop flushing valve assembly of claim 8, wherein the proximal end of the valve body is crimped to the second end of the fluid passage plug.

11. The loop flushing valve assembly of claim 8, wherein the first set amount is equal to the second set amount.

12. A hydraulic system, comprising:
 a hydraulic pump comprising an end cap having internal porting formed therein to connect the hydraulic pump to a first fluid side and a second fluid side, the internal porting further comprising an outlet passage connected to a sump;
 a first valve port formed in the end cap between the first fluid side and the outlet passage, and a second valve port formed in the end cap between the second fluid side and the outlet passage;
 a first valve seat disposed between the first valve port and the outlet passage, and a second valve seat disposed between the second valve port and the outlet passage;
 a first valve subassembly disposed in the first valve port and comprising:
  a first main port plug and a first fluid passage plug;
  a first valve body having a proximal end engaged to the first fluid passage plug and a distal seat end, and a first bore extending through the first valve body, wherein the first valve body is axially moveable from a closed position where it is in contact with the first valve seat to prevent fluid flow from the first fluid side to the outlet passage, to an open position where it is not in contact with the first valve seat;
  a first spring providing a first spring force, the first spring being disposed between and engaged to both the first main port plug and the first fluid passage plug and acting to bias the first valve body to its closed position and the first spring force is sufficient to hold the first valve body in its closed position when the hydraulic pump is in a neutral or near neutral position;
  a first poppet partially disposed in the first bore, the first poppet having a first contact end extending out through the distal seat end of the first valve body, a second end, and a first shoulder formed adjacent to the second end;
 a second valve subassembly disposed in the second valve port and comprising:
  a second main port plug and a second fluid passage plug;
  a second valve body having a proximal end engaged to the second fluid passage plug and a distal seat end, and a second bore extending through the second valve body, wherein the second valve body is axially moveable from a closed position where it is in contact with the second valve seat to prevent fluid flow from the second fluid side to the outlet passage, to an open position where it is not in contact with the second valve seat;
  a second spring providing a second spring force, the second spring being disposed between and engaged to both the second main port plug and the second fluid passage plug and acting to bias the second valve body to its closed position and the second spring force is sufficient to hold the second valve body in its closed position when the hydraulic pump is in the neutral or near neutral position;
  a second poppet partially disposed in the second bore, the second poppet having a first contact end extending out through the distal seat end of the second valve body, a second end, and a second shoulder formed adjacent to the second end;
 wherein, when the pressure in the first fluid side exceeds the pressure in the second fluid side, the first poppet will axially move towards the second poppet and when a pressure differential between the first fluid side and the second fluid side is sufficient to overcome the second spring force, the first poppet will cause the second valve body to move to its open position; and
 wherein, when the pressure in the second fluid side exceeds the pressure in the first fluid side, the second poppet will axially move towards the first poppet and when the pressure differential between the second fluid side and the first fluid side is sufficient to overcome the first spring force, the second poppet will cause the first valve body to move to its open position.

13. The hydraulic system of claim 12, further comprising a case drain formed in the end cap, wherein the outlet passage communicates with the case drain and an external reservoir.

14. The hydraulic system of claim 12, wherein the proximal end of the first valve body is crimped to the first fluid passage plug and the proximal end of the second valve body is crimped to the second fluid passage plug.

15. The hydraulic system of claim 12, wherein:
 the first fluid passage plug comprises a first proximal stem having a first set of spring grip serrations formed thereon and a first distal stem having a first set of crimp serrations formed thereon, and the first spring is engaged to the first proximal stem and secured by the first set of spring grip serrations and the first valve body is engaged to and secured to the first distal stem by the first set of crimp serrations, and
 the second fluid passage plug comprises a second proximal stem having a second set of spring grip serrations formed thereon and a second distal stem having a second set of crimp serrations formed thereon, and the second spring is engaged to the second proximal stem and secured by the second set of spring grip serrations and the second valve body is engaged to and secured to the second distal stem by the second set of crimp serrations.

16. A hydraulic system, comprising:
 a hydraulic pump comprising an end cap having internal porting formed therein to connect the hydraulic pump to a first fluid side and a second fluid side, the internal porting further comprising an outlet passage connected to a sump;
 a first valve port formed in the end cap between the first fluid side and the outlet passage, and a second valve port formed in the end cap between the second fluid side and the outlet passage;
 a first valve seat disposed between the first valve port and the outlet passage, and a second valve seat disposed between the second valve port and the outlet passage;

a first valve subassembly disposed in the first valve port and comprising:
  a first main port plug and a first fluid passage plug;
  a first valve body having a proximal end engaged to the first fluid passage plug and a distal seat end, and a first bore extending through the first valve body, wherein the first valve body is axially moveable from a closed position where it is in contact with the first valve seat to prevent fluid flow from the first fluid side to the outlet passage, to an open position where it is not in contact with the first valve seat, and wherein the first valve body is biased to its closed position;
  a first poppet partially disposed in the first bore, the first poppet having a first contact end extending out through the distal seat end of the first valve body, a second end, and a first shoulder formed adjacent to the second end;
a second valve subassembly disposed in the second valve port and comprising:
  a second main port plug and a second fluid passage plug;
  a second valve body having a proximal end engaged to the second fluid passage plug and a distal seat end, and a second bore extending through the second valve body, wherein the second valve body is axially moveable from a closed position where it is in contact with the second valve seat to prevent fluid flow from the second fluid side to the outlet passage, to an open position where it is not in contact with the second valve seat, and wherein the second valve body is biased to its closed position;
  a second poppet partially disposed in the second bore, the second poppet having a first contact end extending out through the distal seat end of the second valve body, a second end, and a second shoulder formed adjacent to the second end;
wherein, when the pressure in the first fluid side exceeds the pressure in the second fluid side, the first poppet will axially move towards the second poppet and when a pressure differential between the first fluid side and the second fluid side reaches a first set amount, the first poppet will cause the second valve body to move to its open position; and
wherein, when the pressure in the second fluid side exceeds the pressure in the first fluid side, the second poppet will axially move towards the first poppet and when the pressure differential between the second fluid side and the first fluid side reaches a second set amount, the second poppet will cause the first valve body to move to its open position; and
and wherein, when the hydraulic pump is in a neutral or near neutral position, the first valve body and the second valve body are both in their respective closed positions.

17. The hydraulic system of claim 16, wherein the first set amount is equal to the second set amount.

* * * * *